United States Patent
Kamiya

(10) Patent No.: US 10,019,418 B2
(45) Date of Patent: Jul. 10, 2018

(54) EFFICIENT XML INTERCHANGE PROFILE STREAM DECODING

(75) Inventor: Takuki Kamiya, Palo Alto, CA (US)

(73) Assignee: FUJITSU LIMITED, Kawasaki (JP)

( * ) Notice: Subject to any disclaimer, the term of this patent is extended or adjusted under 35 U.S.C. 154(b) by 966 days.

(21) Appl. No.: 13/554,879

(22) Filed: Jul. 20, 2012

(65) Prior Publication Data

US 2014/0026030 A1     Jan. 23, 2014

(51) Int. Cl.
    *G06F 17/00*     (2006.01)
    *G06F 17/22*     (2006.01)

(52) U.S. Cl.
    CPC ...... *G06F 17/2247* (2013.01); *G06F 17/2258* (2013.01)

(58) Field of Classification Search
    CPC .................................................. G06F 17/2247
    See application file for complete search history.

(56) References Cited

U.S. PATENT DOCUMENTS

| | | | | |
|---|---|---|---|---|
| 7,801,926 | B2 * | 9/2010 | Hunter et al. | 707/802 |
| 7,987,420 | B1 * | 7/2011 | Kloba et al. | 715/238 |
| 8,015,483 | B2 * | 9/2011 | Vishwanath et al. | 715/234 |
| 8,191,040 | B2 * | 5/2012 | Hejlsberg et al. | 717/114 |
| 2003/0046317 | A1 * | 3/2003 | Cseri et al. | 707/513 |
| 2006/0212799 | A1 | 9/2006 | Kamiya | |
| 2009/0183067 | A1 * | 7/2009 | Fablet | 715/234 |
| 2009/0210783 | A1 * | 8/2009 | Bellessort | 715/234 |
| 2009/0271695 | A1 * | 10/2009 | Ruellan et al. | 715/227 |
| 2009/0287625 | A1 * | 11/2009 | Fablet et al. | 706/45 |
| 2010/0010995 | A1 * | 1/2010 | Fablet et al. | 707/6 |
| 2010/0083101 | A1 * | 4/2010 | Denoual et al. | 715/242 |
| 2010/0153837 | A1 * | 6/2010 | Bellessort et al. | 715/234 |
| 2010/0192056 | A1 * | 7/2010 | Bellessort et al. | 715/237 |
| 2010/0241949 | A1 * | 9/2010 | Ruellan et al. | 715/234 |
| 2010/0287460 | A1 * | 11/2010 | Denoual et al. | 715/234 |
| 2011/0010614 | A1 * | 1/2011 | Fablet et al. | 715/234 |
| 2011/0153531 | A1 * | 6/2011 | Ishizaki | 706/12 |
| 2011/0270895 | A1 * | 11/2011 | Shelby | 707/803 |
| 2012/0124017 | A1 * | 5/2012 | Heuer et al. | 707/693 |
| 2012/0150828 | A1 * | 6/2012 | Fablet et al. | 707/693 |
| 2012/0254231 | A1 * | 10/2012 | Doi | 707/769 |

(Continued)

OTHER PUBLICATIONS

World Wide Web Consortium. Extensible Markup Language (XML) 1.0 (Fifth Edition), ed. Tim Bray et al. W3C Recommendation Nov. 26, 2008. http://www.w3.org/TR/xml/.

(Continued)

*Primary Examiner* — Scott Baderman
*Assistant Examiner* — Barbara Level
(74) *Attorney, Agent, or Firm* — Maschoff Brennan

(57) ABSTRACT

A method of reducing dynamic memory usage during the decoding of an Efficient XML Interchange (EXI) stream may include parsing an EXI Profile stream to identify each element within the EXI Profile stream that is not defined by an associated XML schema. The method may also include examining the first bit after a corresponding SE event for each of the identified elements. The method may also include assigning an initial built-in element grammar with no top-level production to each element where the first bit is set to 0 or an augmented built-in element grammar with one top level production of AT(xsi:type) to each element where the first bit is set to 1.

20 Claims, 6 Drawing Sheets

(56) References Cited

U.S. PATENT DOCUMENTS

| | | | |
|---|---|---|---|
| 2012/0254724 A1* | 10/2012 | Doi .............................. | 715/234 |
| 2012/0254725 A1* | 10/2012 | Doi .............................. | 715/234 |
| 2012/0330984 A1* | 12/2012 | Fablet et al. ................. | 707/755 |
| 2013/0103721 A1* | 4/2013 | Doi et al. ..................... | 707/802 |
| 2013/0104033 A1* | 4/2013 | Doi et al. ..................... | 715/234 |
| 2013/0110914 A1* | 5/2013 | Heuer et al. ................. | 709/203 |
| 2014/0115104 A1* | 4/2014 | Heuer et al. ................. | 709/217 |
| 2014/0297692 A1* | 10/2014 | Doi .............................. | 707/803 |
| 2014/0337522 A1* | 11/2014 | Kuntschke et al. .......... | 709/224 |

OTHER PUBLICATIONS

World Wide Web Consortium. Efficient XML Interchange (EXI) Format 1.0, ed. John Schneider et al. W3C Recommendation Mar. 10, 2011. http://www.w3.org/TR/exi/.

World Wide Web Consortium. W3C XML Schema Definition Language (XSD) 1.1 Part 1: Structures, ed. Henry S. Thompson et al. W3C Recommendation Apr. 5, 2012. http://www.w3.org/TR/xmlschema11-1/.

World Wide Web Consortium. W3C XML Schema Definition Language (XSD) 1.1 Part 2: Datatypes, ed. David Peterson et al. W3C Recommendation Apr. 5, 2012. http://www.w3.org/TR/xmlschema11-2/.

World Wide Web Consortium. Efficient XML Interchange (EXI) Profile, ed. Youenn Fablet et al. W3C Working Draft. Apr. 10, 2012. http://www.w3.org/TR/exi-profile/.

\* cited by examiner

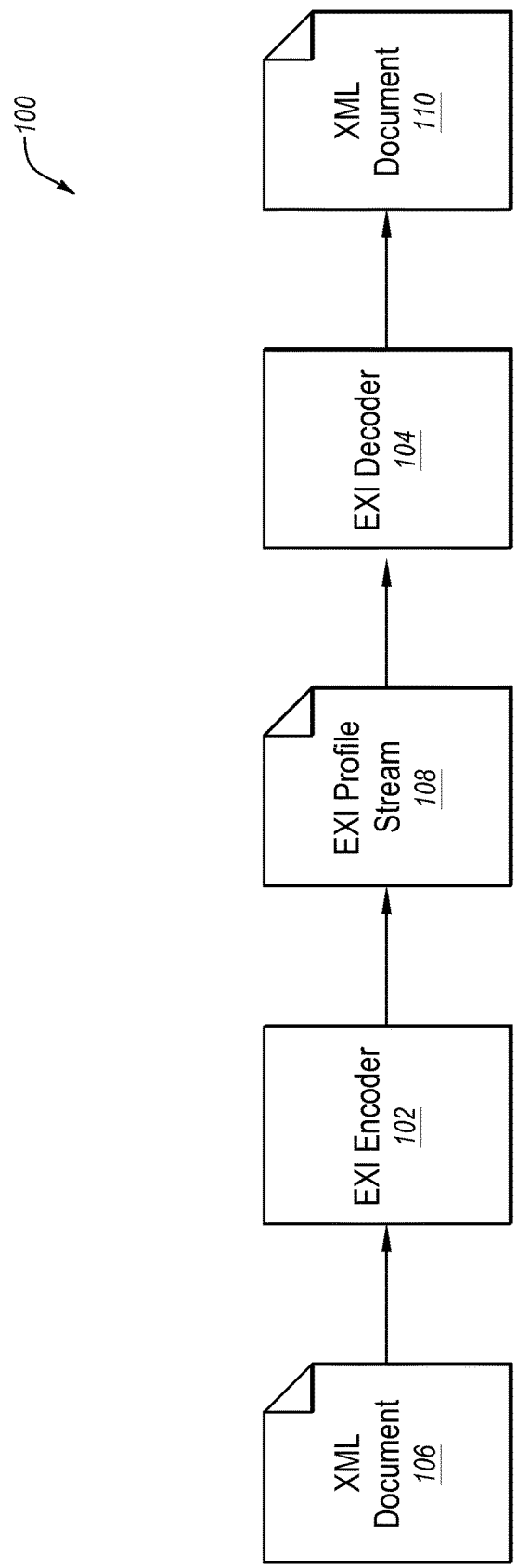

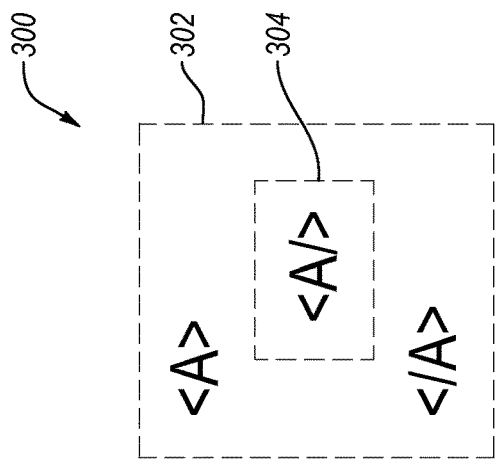

EFFICIENT XML INTERCHANGE PROFILE STREAM DECODING

FIELD

The embodiments discussed herein are related to Efficient XML Interchange (EXI) Profile stream decoding.

BACKGROUND

Extensible Markup Language (XML) is a markup language that defines a set of rules for encoding documents in a plain-text format that is both human-readable and machine-readable. One version of XML is defined in the XML 1.0 Specification produced by the World Wide Web Consortium (W3C) and dated Nov. 26, 2008, which is incorporated herein by reference in its entirety. The XML 1.0 Specification defines an XML document as a text that is well-formed and valid.

An XML schema is a description of a type of XML document, typically expressed in terms of constraints on the structure and content of documents of that type, above and beyond the basic syntactical constraints imposed by the XML 1.0 Specification itself. These constraints are generally expressed using some combination of grammatical rules governing the order of elements, boolean predicates associated with the content, data types governing the content of elements and attributes, and more specialized rules such as uniqueness and referential integrity constraints. The process of checking to see if an XML document conforms to an XML schema is called validation, which is separate from XML's core concept of syntactic well-formedness. All XML documents are defined as being well-formed, but an XML document is on check for validity where the XML processor is "validating," in which case the XML document is checked for conformance with its associated schema.

Although the plain-text human-readable aspect of XML documents may be beneficial in many situations, this human-readable aspect may also lead to XML documents that are large in size and therefore incompatible with devices with limited memory or storage capacity. Efforts to reduce the size of XML documents have therefore often eliminated this plain-text human-readable aspect in favor of more compact binary representations.

EXI is a Binary XML format in which XML documents are encoded in a binary data format rather than plain text. In general, using a binary XML format reduces the size and verbosity of XML documents, and may reduce the cost in terms of time and effort involved in parsing XML documents. EXI is formally defined in the EXI Format 1.0 Specification produced by the W3C and dated Mar. 10, 2011, which is incorporated herein by reference in its entirety. An XML document may be encoded in an EXI format as a separate EXI stream.

When no schema information is available or when available schema information describes only portions of an EXI stream, EXI employs built-in element grammars. Built-in element grammars are dynamic and continuously evolve to reflect knowledge learned while processing an EXI stream. New built-in element grammars are created to describe the content of newly encountered elements and new grammar productions are added to refine existing built-in grammars. Newly learned grammars and productions are used to more efficiently represent subsequent elements in the EXI stream.

While useful for reflecting knowledge learned while processing an EXI stream, the dynamic and continuously evolving aspect of built-in element grammars may cause EXI streams to grow in dynamic memory to a point where the space allocated in dynamic memory for built-in element grammars is relatively large in size. This relatively large size may be problematic where an EXI stream is processed by an EXI processor that is employed in a device with limited memory capacity.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of reducing dynamic memory usage during the decoding of an Efficient XML Interchange (EXI) Profile stream may include parsing an EXI Profile stream to identify each element within the EXI Profile stream that is not defined by an associated XML schema. The method may also include examining the first bit after a corresponding SE event for each of the identified elements. The method may also include assigning an initial built-in element grammar with no top-level production to each element where the first bit is set to 0 or an augmented built-in element grammar with one top level production of AT(xsi:type) to each element where the first bit is set to 1.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1 is a block diagram of an example Efficient XML Interchange (EXI) processing system;

FIG. 3 illustrates an example XML document;

FIG. 4 illustrates the example XML document of FIG. 3 after having been encoded into an example EXI Profile stream represented as a series of bytes;

DESCRIPTION OF EMBODIMENTS

Figures 2A, 2B:
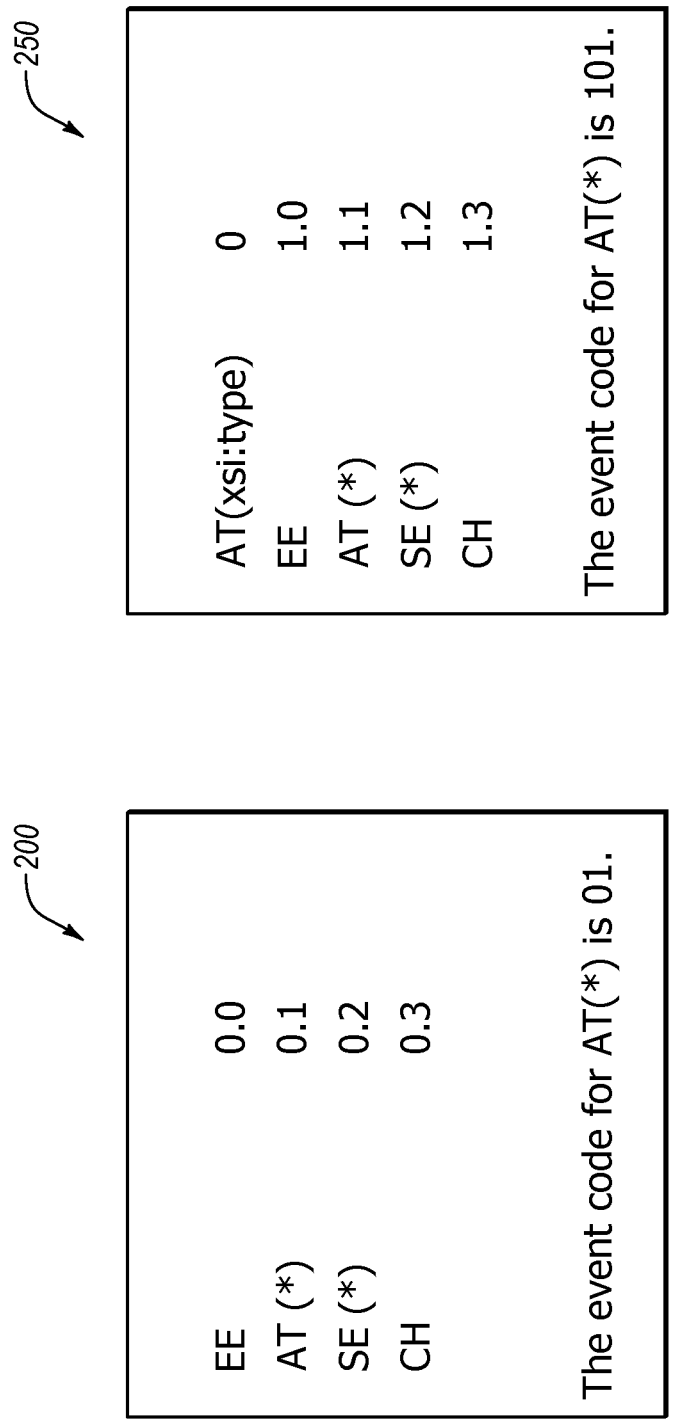
FIG. 2A illustrates an example initial EXI built-in element grammar.
FIG. 2B illustrates an example augmented EXI built-in element grammar.

Some embodiments described herein may include methods of reducing dynamic memory usage during the decoding of an Efficient XML Interchange (EXI) Profile stream. As used herein, the phrase "EXI Profile stream" refers to a stream that conforms to the EXI Profile Specification produced by the W3C and dated Apr. 10, 2012, which is incorporated herein by reference in its entirety. By eliminating certain dynamic and continuously evolving aspects of built-in element grammars, dynamic memory usage during the decoding of an EXI Profile stream may be reduced.

As used herein, the term "stream" refers to any electronic stream, document, or file. Therefore, as used herein, the phrase "EXI Profile stream" is synonymous with "EXI Profile document" or "EXI Profile file." Similarly, the phrase "XML document" is synonymous with "XML stream" or "XML file."

Embodiments of the present invention will be explained with reference to the accompanying drawings.

FIG. 1 is a block diagram of an example EXI processing system 100, arranged in accordance with at least some embodiments described herein. The EXI processing system 100 may include an EXI encoder 102 and an EXI decoder 104. An example EXI encoder and an example EXI decoder are included in the OpenEXI project hosted at SourceForge.net. The source code and documentation of the OpenEXI project as of the filing date of the present application are incorporated herein by reference in their entirety. The EXI encoder 102 is configured to receive as input an XML document 106 and encode the XML document 106 into an EXI Profile stream 108. The EXI Profile stream 108 may then be received as input by the EXI decoder 104 where the EXI Profile stream 108 may be decoded back into an XML document 110. The XML document 106 and the XML document 110 may include identical XML data, although certain types of human-readable information items, such as whitespace, comments, and processing instructions, may not be preserved in the XML document 110, depending on the preserve settings of the EXI encoder 102. The EXI decoder 104 may be employed in a device with limited memory capacity. Examples of devices with limited memory capacity include, but are not limited to, sensors or appliances.

FIG. 2A illustrates an example initial EXI built-in element grammar 200 and FIG. 2B illustrates an example augmented EXI built-in element grammar 250. The EXI built-in element grammars 200 and 250 can be employed, for example, by the EXI decoder 104 during the decoding of the EXI Profile Stream 108. The initial EXI built-in element grammar 200 does not include an "AT(xsi:type)" production, while the augmented EXI built-in element grammar 200 does include an "AT(xsi:type)" production. The first time that an element with a new QName is encountered in an EXI Profile stream, the initial EXI built-in element grammar 200 is used to decode the element. QName values are composed of a uniform resource identifier (URI), a local-name, and an optional prefix. Two QNames—are considered equal if they have the same URI and local-name, regardless of their prefix values. Every subsequent time that an element with an equal QName is encountered in an EXI Profile stream, the augmented state EXI built-in element grammar 250 is used to decode the element.

FIG. 3 illustrates an example XML document 300. The example XML document 300 may correspond to the XML document 106 and/or 110 of FIG. 1, for instance. The example XML document 300 includes a root element 302 with a QName "A" and a nested element 304 also with a QName "A" that is nested within the root element 302. It is understood that the example XML document 300 is only a very simple example of an XML document that may be encoded into an EXI Profile stream and then decoded back into an XML document according to the example methods disclosed herein. It is further understood that more complex XML documents may similarly benefit from the example methods disclosed herein.

FIG. 4 illustrates the example XML document 300 of FIG. 3 after having been encoded into an example EXI Profile stream 400 represented as a series of bytes. The EXI Profile stream 400 may correspond to the EXI Profile stream 108 of FIG. 1, for example. Each byte in the EXI Profile stream 400 is represented by two (2) hexadecimal symbols, with the first hexadecimal symbol representing the first four (4) bits of the eight (8) bits that make up the byte, and with the second hexadecimal symbol representing the second four (4) bits of the eight (8) bits that make up the byte. For example, the fourth byte from the left is represented by the two (2) hexadecimal symbols "2" and "b" with the first hexadecimal symbol "2" representing the first four (4) bits "0010" of the byte and with the second hexadecimal symbol "b" representing the second four (4) bits "1011" of the byte. Thus, the fourth byte's two-symbol hexadecimal representation of "2b" is equivalent to the 8-digit bit pattern of "00101011".

Figure 5:
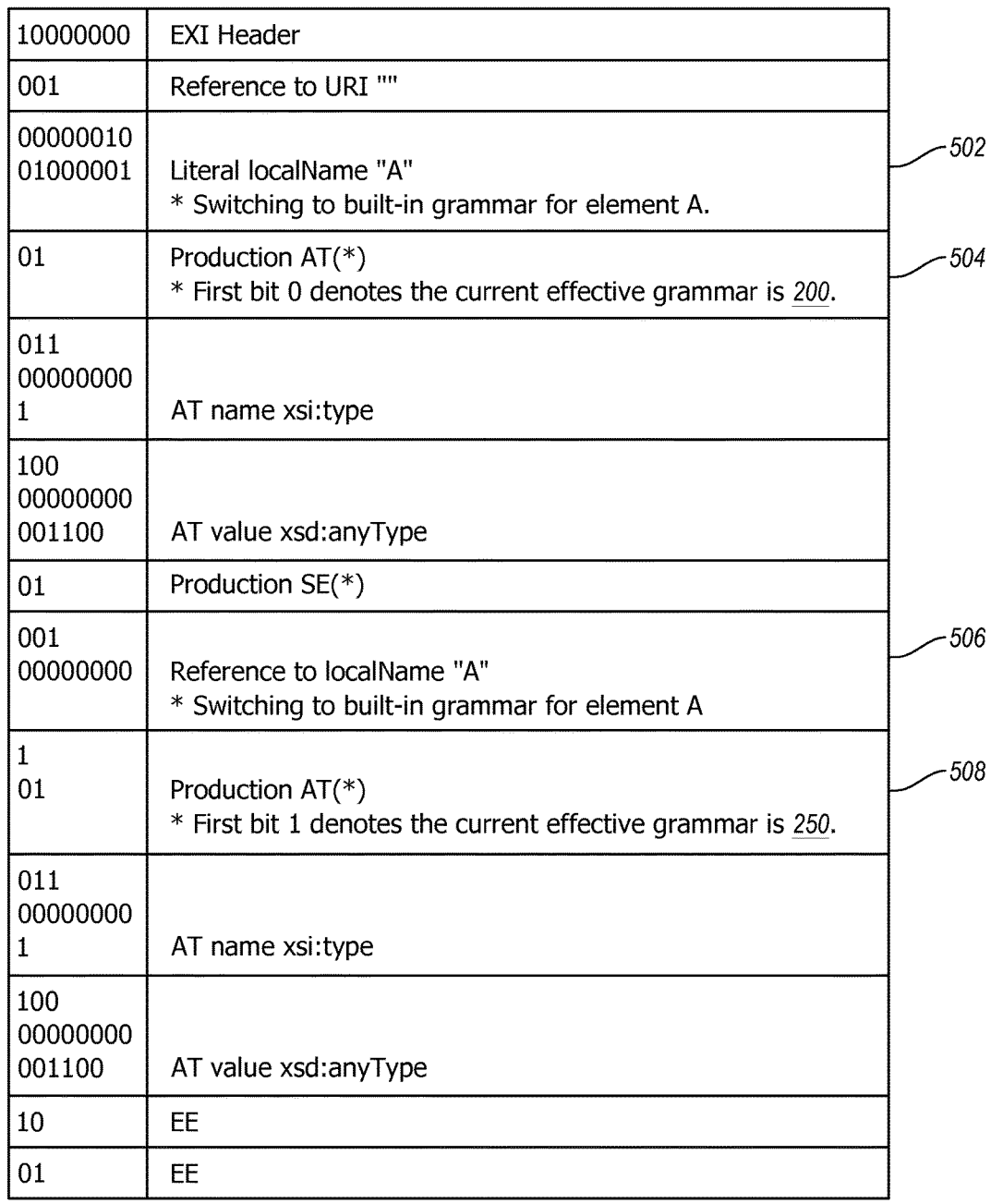
FIG. 5 is a chart of the example EXI Profile stream of FIG. 4 represented as a series of bits where the dynamic memory usage is reduced during decoding according to at least some embodiments described herein.

FIG. 5 is a chart 500 of the example EXI Profile stream 400 of FIG. 4 represented as a series of bits where the dynamic memory usage is reduced during decoding according to at least some embodiments described herein. The chart 500 illustrates the bit pattern of the example EXI Profile stream 400 of FIG. 4 on the left-hand column and a brief explanation of the bits in the right-hand column. The bits in the chart 500 correspond exactly with the bytes in the example EXI Profile stream 400 of FIG. 4. For example, the first eight (8) bits of "10000000" in the chart 500 of FIG. 5 correspond to the first byte's two-symbol hexadecimal representation of "80" in the EXI Profile stream 400 of FIG. 4.

As illustrated in the chart 500 of FIG. 5 and in FIGS. 2A, 2B, and 3, when an SE event for the first root element 302 with QName "A" is encountered in row 502, the first bit after the SE event is examined in row 504. SE events part of the EXI are discussed in the EXI Format 1.0 Specification. Since the first bit in row 504 is a "0" bit, the initial EXI built-in element grammar 200 of FIG. 2A with no top-level production is assigned to the content of the first root element 302. In contrast, when an SE event for the second nested element 304 with QName "A" is encountered in row 506, the first bit after the SE event is examined in row 508. Since the first bit in row 508 is a "1" bit, the augmented EXI built-in element grammar 250 with one top level production of AT(xsi:type) is assigned to the content of the second nested element 304. In this manner, the appropriate grammar may be assigned to the content of an element depending on whether the QName of the element has been previously encountered in other elements during the decoding of the corresponding EXI Profile stream.

Figure 6:
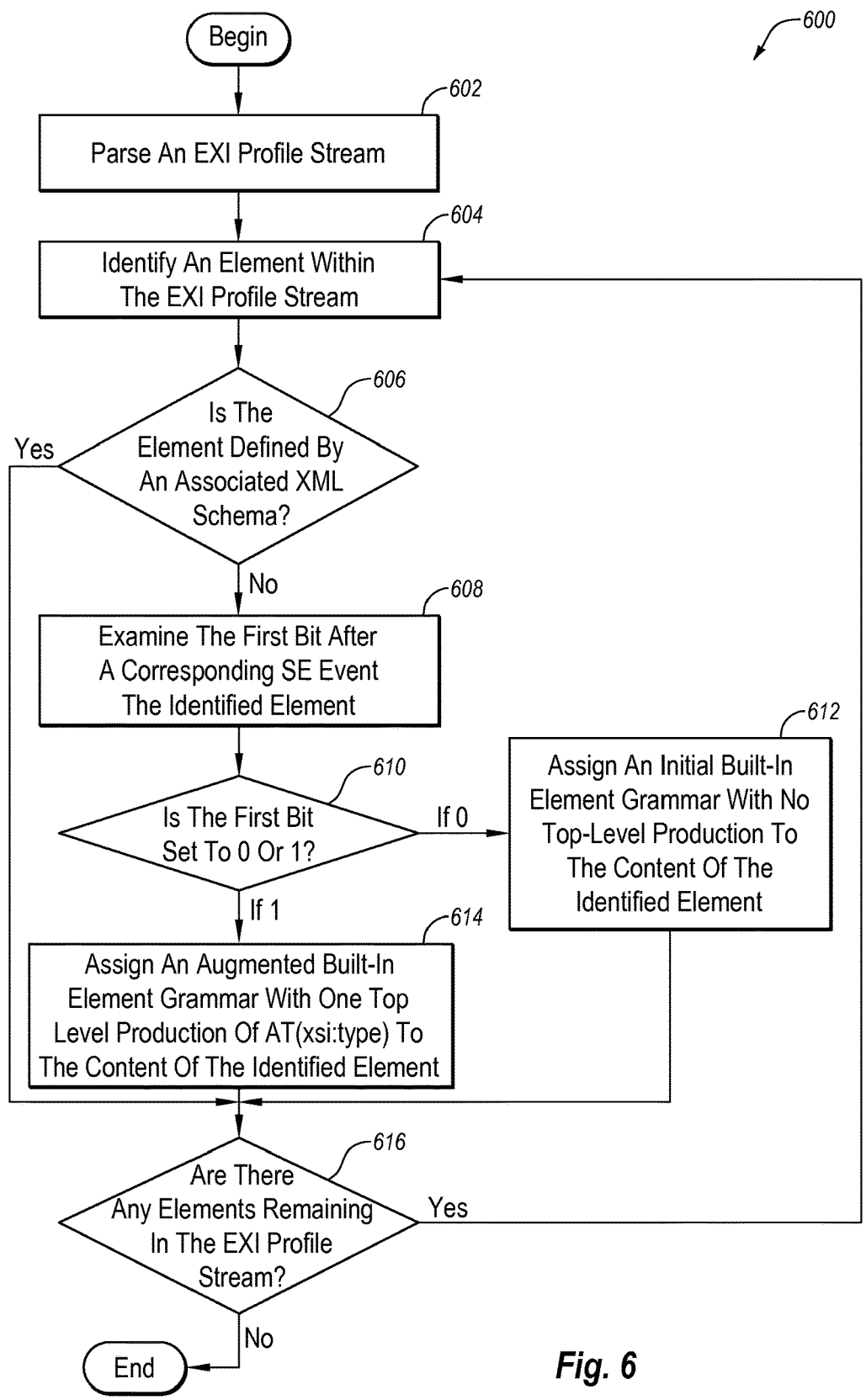
FIG. 6 is a flow chart of an example method of reducing dynamic memory usage during the decoding of an EXI Profile stream according to at least some embodiments described herein.

FIG. 6 is a flow chart of an example method 600 of reducing dynamic memory usage during the decoding of an EXI Profile stream. The method 600 may be implemented, in some embodiments, by an EXI processing system, such as the example EXI processing system 100 of FIG. 1. For example, the EXI decoder 104 of the EXI processing system 100 of FIG. 1 may be configured to execute computer instructions to perform operations of reducing dynamic memory usage during the decoding of the EXI Profile stream 108, as represented by one or more of blocks 602, 604, 606, 608, 610, 612, 614, and/or 616 of the method 600. Although illustrated as discrete blocks, various blocks may be divided into additional blocks, combined into fewer blocks, or eliminated, depending on the desired implementation. The method 600 will now be discussed with reference to FIG. 6 and FIGS. 1, 2A, 2B, 3, and 5.

The method 600 may begin at block 602, in which an EXI Profile stream is parsed. For example, the EXI decoder 104 may parse through the EXI Profile stream 108.

In block 604, an element is identified within the EXI Profile stream. For example, the EXI decoder 104 may identify an element with QName "A" in the EXI Profile stream 108.

In decision block 606, it is determined whether the element is defined by an associated XML schema. For example, the EXI decoder 104 may determine whether the identified element with QName "A" is defined by an associated XML schema. If so ("Yes" at decision block 606), the method 600 proceeds to decision block 616, discussed below. If not ("No" at decision block 606), then the method 600 proceeds to block 608.

In block 608, the first bit after a corresponding SE event for the identified element is examined. For example, the EXI decoder 104 may examine the first bit after a corresponding SE event for the identified element with QName "A" in the EXI Profile stream 108.

In block 610, it is determined whether the first bit after a corresponding SE event for the identified element is set to "0" or "1." For example, the EXI decoder 104 may determine whether the first bit after a corresponding SE event for the identified element with QName "A" in the EXI Profile stream EXI Profile stream 108 is set to "0" or "1". If the first bit is set to "0" ("0" at decision block 610), then the method proceeds to block 612 where an initial built-in element grammar with no top-level production is assigned to the content of the element.

For example, where the identified element with QName "A" is the first root element 302 with QName "A" as represented on row 502 of the chart 500, the EXI decoder 104 may assign the initial built-in element grammar 200 with no top-level production to the content of the first root element 302. Conversely, if the first bit is a "1" ("1" at decision block 610), then the method proceeds to block 614 where an augmented built-in element grammar with one top level production of AT(xsi:type) is assigned to the content of the element. For example, where the identified element with QName "A" is the second nested element 304 with QName "A" as represented on row 506 of the chart 500, the EXI decoder 104 may assign the augmented built-in element grammar 250 with one top level production of AT(xsi:type) to the content of the second nested element 304.

At decision block 616, it is determined whether there are any remaining elements in the EXI Profile stream. For example, the EXI decoder 104 may determine whether there are any remaining elements in the EXI Profile stream 108. If so ("Yes" at decision block 616), the method 600 returns to block 606. If not ("No" at decision block 616), the method 600 completes.

Figure 7:
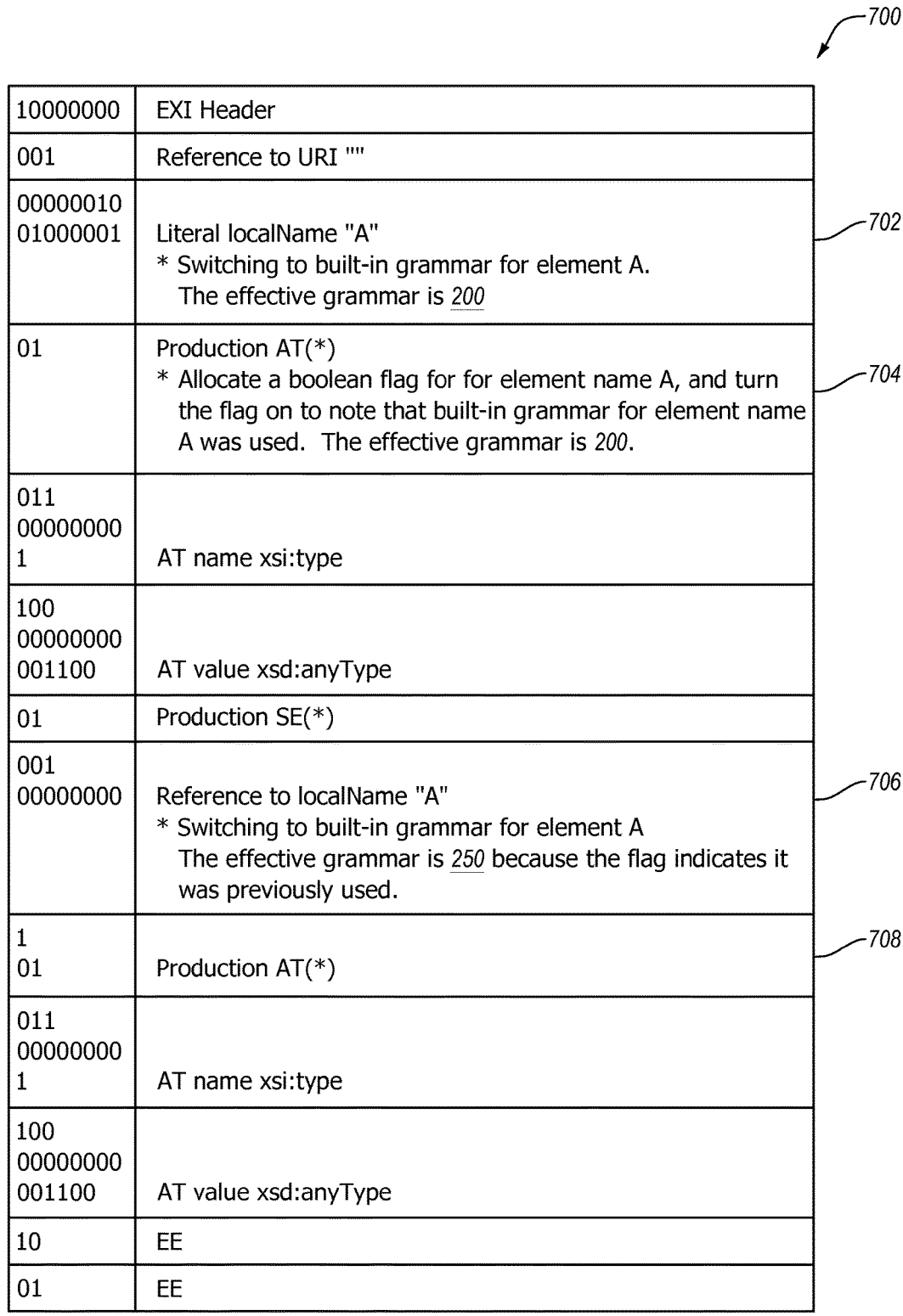
FIG. 7 is a chart of the example EXI Profile stream of FIG. 4 represented as a series of bits where the dynamic memory usage is not reduced during decoding.

FIG. 7 is a chart 700 of the example EXI Profile stream of FIG. 4 represented as a series of bits where the dynamic memory usage is not reduced during decoding. In contrast to the chart 500 that is processed according to at least some embodiments described herein, the chart 700 is processed according to prior art methods. In particular, when an SE event for the first root element 302 with QName "A" is encountered in row 702, instead of examining the first bit after the SE event in row 704, a boolean flag is allocated in dynamic memory to track that an element with QName "A" has been encountered. Then, when an SE event for the second nested element 304 with QName "A" is encountered in row 706, instead of examining the first bit after the SE event in row 708, the boolean flag that was previously allocated in dynamic memory is referenced to determine that an element with QName "A" has been previously encountered.

Therefore, the embodiments disclosed herein include methods of reducing dynamic memory usage during the decoding of an EXI Profile stream. By determining which built-in grammar to assign by simply examining the bits following a corresponding SE event for each element of an EXI Profile stream, and thereby eliminating certain dynamic and continuously evolving aspects of built-in element grammars, dynamic memory usage during the decoding of the EXI Profile stream may be reduced. In particular, a built-in element grammar may not grow in dynamic memory each time an undefined element is encountered in the EXI Profile stream. Also, the amount of dynamic memory used for evolving built-in element grammars associated with each element may be capped. Further, no space may be allocated in dynamic memory for built-in element grammars. Finally, built-in element grammars may be assigned without examining or allocating any boolean flag in dynamic memory.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of reducing dynamic memory usage during decoding of an Efficient XML Interchange (EXI) stream in a sensor, the method comprising:
   parsing an EXI Profile stream to identify each element within the EXI Profile stream that is not defined by an associated XML schema;
   examining a first bit after a corresponding SE event for each of the identified elements within the EXI Profile stream;
   assigning an initial built-in element grammar with no top-level production to each element where the first bit is set to 0 or an augmented built-in element grammar with one top level production of AT(xsi:type) to each element where the first bit is set to 1; and
   capping in the sensor an amount of dynamic memory used for evolving built-in element grammars associated with each element that include the initial built-in element grammar and the augmented built-in element grammar.

2. The method according to claim 1, wherein one or more of the identified elements is a root element.

3. The method according to claim 1, wherein one or more of the identified elements is a nested element.

4. The method according to claim 1, wherein each of the built-in element grammars does not grow in the dynamic memory each time an undefined element is encountered in the EXI Profile stream.

5. The method according to claim 1, wherein no space is allocated in the dynamic memory for the built-in element grammars.

6. The method according to claim 1, wherein the method is performed on the sensor.

7. A non-transitory computer-readable medium storing a program that causes a processor to execute the method according to claim 1.

8. The method according to claim 1, wherein the method is performed on an appliance.

9. An EXI decoding system comprising:
   an EXI decoding device including a non-transitory computer-readable medium, a processor, and a dynamic memory, the non-transitory computer-readable medium storing a program that causes the processor to execute a method of reducing dynamic memory usage during decoding of an EXI Profile stream in a sensor, the method comprising:
   parsing an EXI Profile stream to identify each element within the EXI Profile stream that is not defined by an associated XML schema;
   examining a first bit after an SE event corresponding to a QName for each of the identified elements;
   assigning an initial built-in element grammar with no top-level production to each element where the first bit is set to 0 or an augmented built-in element grammar with one top level production of AT(xsi:type) to each element where the first bit is set to 1;
   not allocating space in the dynamic memory for built-in element grammars; and
   capping in the sensor an amount of the dynamic memory used for evolving the built-in element grammars that include the initial built-in element grammar and the augmented built-in element grammar.

10. The EXI decoding system according to claim 9, wherein one or more of the identified elements is a root element.

11. The EXI decoding system according to claim 9, wherein one or more of the identified elements is a nested element.

12. The EXI decoding system according to claim 9, wherein each of the built-in element grammars does not grow in the dynamic memory each time an undefined element is encountered in the EXI Profile stream.

13. The EXI decoding system according to claim 9, wherein the assigning is performed without examining or allocating any boolean flag in the dynamic memory.

14. The EXI decoding system according to claim 9, wherein the EXI decoding device is the sensor.

15. The EXI decoding system according to claim 9, wherein the EXI decoding device is an appliance.

16. A non-transitory computer-readable medium storing a program that causes a processor to perform operations for reducing dynamic memory usage during decoding of an EXI Profile stream in a sensor, the operations comprising:
   parsing an EXI Profile stream to identify each element within the EXI Profile stream that is not defined by an associated XML schema;
   examining a first bit after an SE event corresponding to a QName for each of the identified elements;
   assigning an initial built-in element grammar with no top-level production to each element where the first bit is set to 0 or an augmented built-in element grammar with one top level production of AT(xsi:type) to each element where the first bit is set to 1 without examining or allocating any boolean flag in dynamic memory; and
   capping in the sensor an amount of the dynamic memory used for evolving built-in element grammars associated with each element that include the initial built-in element grammar and the augmented built-in element grammar.

17. The non-transitory computer-readable medium according to claim 16, wherein each of the identified elements is a root element or a nested element.

18. The non-transitory computer-readable medium according to claim 16, wherein each of the built-in element grammars does not grow in the dynamic memory each time an undefined element is encountered in the EXI Profile stream.

19. The non-transitory computer-readable medium according to claim 16, wherein no space is allocated in the dynamic memory for the built-in element grammars.

20. The non-transitory computer-readable medium according to claim 16, wherein the operations are performed on the sensor.

* * * * *